United States Patent [19]

Johnson, Jr. et al.

[11] E Re. 31,086

[45] Reissued Nov. 23, 1982

[54] PLASTIC HINGE CONSTRUCTION

[75] Inventors: Edward M. Johnson, Jr., Matteson, Ill.; John T. Stone, Saylorsburg, Pa.

[73] Assignee: W. R. Grace & Co., Cryovac Division, Duncan, S.C.

[21] Appl. No.: 48,429

[22] Filed: Jun. 14, 1979

Related U.S. Patent Documents

Reissue of:

[64] Patent No.: 4,029,234
Issued: Jun. 14, 1977
Appl. No.: 721,935
Filed: Sep. 10, 1976

[51] Int. Cl.[3] ..... B65D 51/04

[52] U.S. Cl. ..... 220/337; 220/334; 220/338

[58] Field of Search ..... 220/337, 338, 339, 334; 264/DIG. 33, 299, 343

[56] References Cited

U.S. PATENT DOCUMENTS

| | | | |
|---|---|---|---|
| 2,356,926 | 8/1944 | Gits | 220/337 |
| 2,627,995 | 2/1953 | Waterman | 220/338 |
| 2,677,479 | 5/1954 | Kiba | 220/338 |
| 2,850,200 | 9/1958 | Hofmann | 220/334 |
| 2,858,039 | 10/1958 | Gibbs | 220/31 |
| 2,960,253 | 11/1960 | Kiba | 220/338 |
| 2,960,254 | 11/1960 | Kiba | 220/338 |
| 3,055,534 | 9/1962 | Boenecke | 220/338 |
| 3,086,676 | 4/1963 | Dilatush | 220/31 |
| 3,159,697 | 12/1964 | Tocci | 264/DIG. 33 |
| 3,317,955 | 5/1967 | Schurman et al. | 264/98 |
| 3,339,781 | 9/1967 | Schurman | 220/334 X |
| 3,342,190 | 9/1967 | Hultgren et al. | 220/338 X |
| 3,424,829 | 1/1969 | Peters et al. | 264/89 |
| 3,452,125 | 6/1969 | Schurman et al. | 264/89 |
| 3,796,780 | 3/1974 | Schurman | 264/98 |
| 4,005,800 | 2/1977 | Schurman | 220/337 |

FOREIGN PATENT DOCUMENTS 654579 6/1963 Italy .

*Primary Examiner*—Steven M. Pollard
*Attorney, Agent, or Firm*—John J. Toney; William D. Lee, Jr.; Joseph P. Harps

[57] ABSTRACT

In a blow molded container having a base and a lid, a hinge formed of the molding material and defined in part by integral journals depending from opposite sides of the lid and integral pins extending from opposite sides of the base adapted to interfit with the integral journals.

8 Claims, 4 Drawing Figures

PLASTIC HINGE CONSTRUCTION

Matter enclosed in heavy brackets [ ] appears in the original patent but forms no part of this reissue specification; matter printed in italics indicates the additions made by reissue.

SUMMARY—BACKGROUND OF THE INVENTION

The present invention relates to hinge constructions for plastic molded parts and more particularly to a molded plastic hinge construction for a plastic, blow molded container having a base and a lid connected by the hinge.

Various hinge constructions have been developed for plastic blow molded containers having a lid and a base. One form is referred to as a 'live' hinge and is formed by simultaneously molding the lid and base and having a relatively thin webb of material interconnecting the lid and base. With a hinge of this type there can be problems of fatigue and ultimate failure of the webb because of the continuous flexing of the webb.

Another construction utilizes a more conventional type hinge and has a metallic pin inserted through interfitting bosses after molding. The problem with this latter type of construction is that it requires an extra assembly step after molding and in addition causes alignment problems. Further it is not uncommon for the pins to be inserted out of alignment or with the lid and base out of alignment resulting in a poor fit and an unsightly appearance. This is important where the containers are used to house and display for sale relatively expensive tools. An unsightly container could possibly have a negative effect on the sale of the tools while a well constructed container could have the opposite effect.

In the present invention the hinge is defined by a pin on one member and a depending journal on the other. The members are blow molded and generally are formed from an extruded parison of the plastic material to have a double walled hollow construction with each wall being relatively thin e.g. approximately 0.060 inch. However, in order to provide adequate strength and rigidity the pin and journal are formed by compression of a double thickness of the extruded parison material and are not blown, and hence are solid and not hollow. By molding the pin and journal integrally with their associated members, accurate location of each with their associated members can be provided and proper fit and alignment can be more readily assured between the members. i.e. lid and base. At the same time the members rotate relatively to each other and are not faced with the fatigue problems of the 'live hinge' which continuously flexes.

In addition, in the present invention the journal is provided to be at least partially of a strap like, depending structure and hence defines a flexible structure which assists in assembly. Further the opening in the journal is formed by a pair of offset semicircular portions whereby forming is facilitated.

Also in the present invention the components of the hinge are compression molded by plastically deforming the material of the parison into a desired shape different from that generally defined by the parison.

Therefore, it is an object of the present invention to provide an improved molded plastic hinge for blow molded containers.

It is another object of the present invention to provide a plastic hinge integrally molded with associated blow molded parts with the hinge being non-blown and formed from compression of a double thickness of the extruded parison.

It is another general object to provide an improved plastic container and hinge of the above described type.

Other objects, features, and advantages of the present invention will become apparent from the subsequent description and the appended claims, taken in conjunction with the accompanying drawing, in which:

Figure 1:
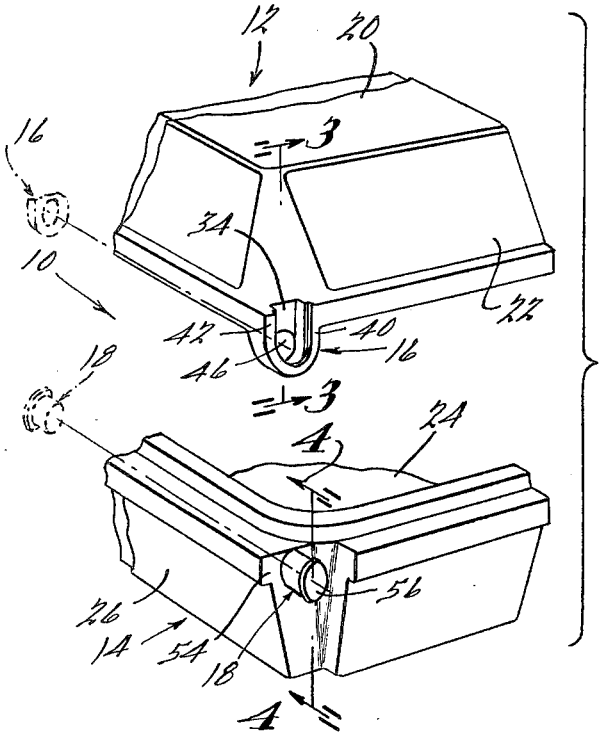
FIG. 1 is a fragmentary perspective view of a lid and base with the lid including integrally molded journals and the base including integrally molded interfitting pins.

Looking now to the drawings, FIG. 1 shows a container 10 having a lid 12 and a base 14. The lid 12 has a pair of journals 16 (one shown in phantom) which are depending from the lower portion of opposite rearward sides of the lid 12. A pair of pins 18 (one shown in phantom) extend outwardly from the upper portion of opposite rearward sides of base 14 and are adapted to engage within the journals 16 whereby the lid 12 can be pivotally connected to the base 14 by the hinge defined by journals 16 and pins 18.

The lid 12 is a blow molded part, molded in a conventional manner to have a double walled construction for its top 20 and side walls 22. In a similar manner base 14 has a double walled construction for its bottom 24 and side walls 26. In both cases the double wall is defined by a pair of inner and outer shells which are formed upon inflation of the extruded plastic parison. The lid 12 and base 14 are blow molded of a thermoplastic material which is preferably high density polyethelene.

Figure 2:
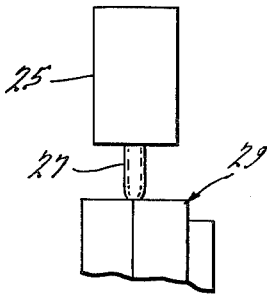
FIG. 2 is a partial schematic diagram depicting the molding of the lid.

Looking now to FIG. 2 an extrusion die 25 is depicted providing an extruded, hollow parison 27 of a suitable thermoplastic material; the parison 27 is acted upon in a mold assembly 29 to form the lid 12 and base 14. The blow molding process is well known in the art and hence the details thereof have been omitted.

Figure 3:
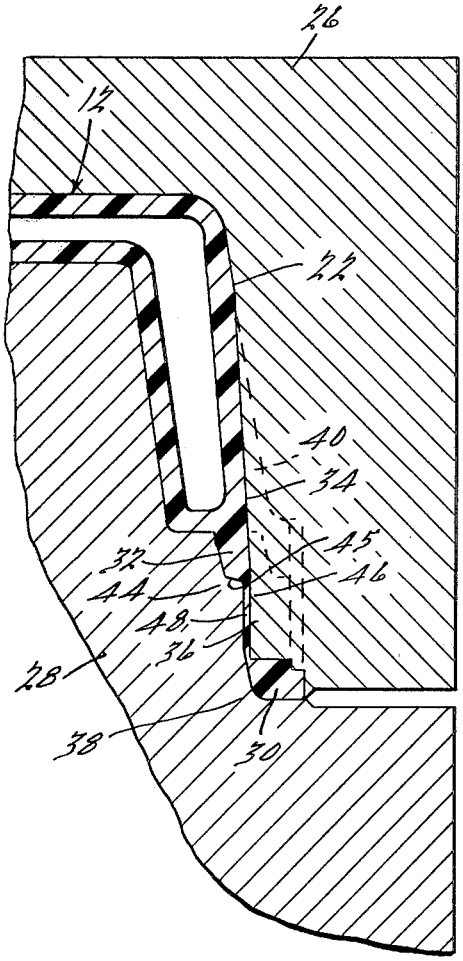
FIG. 3 is a fragmentary, partial sectional view depicting the integral forming of the journal with the lid of FIG. 1 and depicting a section of the lid generally taken along the line 3—3 in FIG. 1.
Figure 4:
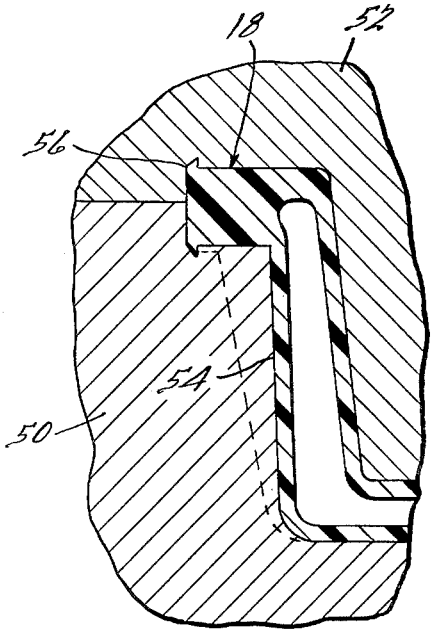
FIG. 4 is a fragmentary, partial sectional view depicting the integral forming of the pin with the base of FIG. 1 and depicting a section of the base generally taken along the line 4—4 in FIG. 1.

Looking now to FIG. 3, the lid 12 is molded in mold assembly 29 by an outer mold 26 and a plug 28. The plug 28 interfits with the outer mold 26 to pinch what would be the two opposite open ends of the parison whereby a sealed plastic envelope is defined. Next the envelope is inflated forcing it outwardly into engagement with the confronting surfaces of the plug 28 and mold 26 to thereby reproduce the shape of those surfaces. When this is done the resulting walls are formed from a single thickness of the parison material which will provide adequate strength for the lid 12. However, it is desirable that the hinge components be made of greater thickness to provide better wear, rigidity, strength, etc. Thus in the present invention the journal 16 is not blown but is formed to a desired shape by compression of a double thickness of the material of the parison.

The journal 16 is defined by two axially offset generally semicircular portions 30 and 32. The side wall 22 is partially indented or slotted at 34 by a portion 36 of the outer mold 26. At the same time a portion 38 of the plug 28 cooperates with the mold 26 to define the lower portion 30 in a generally semicircular strap. The strap portion 30 is connected to the lid 12 by ribs 40 and 42. The other portion 32 is formed by a stepped portion 44 of the plug 28 cooperating with the slot forming portion of the outer mold 26. The portion 32 has a surface 45 semicircularly shaped by plug portion 44 and with the strap portion 30 defines a semicircularly offset, circular opening 46. Note that the parison materials are compressed to form the strap portion 30 and the complementary stepped portion 32. Since the parison materials are compressed the subsequent inflation of the parison will generally not affect the portions 30 and 32 which will thereby be maintained as solid, not hollow, structures with a desired wall thickness and desired wall shape. In the latter regard it should be noted that the shape of the support surfaces of portions 30 and 32 can be varied and need not be dictated solely by the parison wall thickness. The double thickness of parison materials is utilized mainly to provide a sufficient quantity of material such that the desired shape can be attained upon compression. Hence the ultimate thickness could be greater or less than double. In a preferred form of the invention the width or thickness of strap portion 30 is at least around 0.120 inch where the parison had a single wall thickness of around 0.060 inch.

While the journal 16 is depending downwardly from the lid 12 it does not protrude transversely outwardly beyond the general outer periphery of the side walls 22 and hence does not needlessly increase the overall size of the container 10.

In the process of molding, a thin wall 48 will result in the opening 46. This wall can be knocked out either before assembly by a conventional tool or will be removed by the pin 18 during assembly. As will be seen except for this minor step the hinge is completely formed as molded. Note that by forming the opening 46 with portions 30 and 32 axially offset the molding thereof is facilitated.

The pin 18 is molded in a generally similar manner and is formed from an outer mold 50 and a plug 52 of mold assembly 29. An indentation 54 is formed on the outer shell of side wall 26 whereby the pin 18 can be formed without extending substantially beyond the periphery of the side walls 26 and hence does not needlessly increase the overall size of the container 10. Note that the indentation 54 is sufficient to receive the width of the depending journal 16 whereby the pin 18 and journal 16 are located substantially within the confines of side walls 22 and 26. One half of the pin 18 is formed by the outer mold 50 and the other half formed by the plug 52. The pin 18 is formed by compression of the parison materials and hence will be essentially solid and will not be expanded upon inflation of the enclosed envelope defined from the parison.

In one form of the invention the pin 18 is formed with a retaining bead 56 which is of a diameter slightly larger than the remainder of the pin 18. The pin 18 is of a slightly smaller diameter than opening 46 and can be journaled therein; the bead 56, however, is slightly larger. The resilience of the materials permits adequate elastic deformation to permit assembly. However, the bead 56 upon assembly will maintain the parts from disassembly. In one form of the invention the pin 18 had a diameter of approximately 0.250 inch.

The distance between journals 16 is the same as that between the midpoints of the pins 18. When assembled the journal 16 will be generally centered on pin 18. Thus for assembly the journals 16 must be deflected outwardly and/or the pins 18 must be deflected inwardly to permit assembly. With the above noted construction the flexibility of the depending strap portions 30 will assist in assembly.

With the above structure, the journals 16 are molded integrally with the lid 12 while pins 18 are similarly molded with the base 14. Thus axial alignment of the journals 16 and pins 18 can more readily be provided whereby proper fits between lid 12 and base 14 can more readily be assured. In addition a hinge construction having good wear and strength can be achieved. In this regard the journals 16 and pins 18 rotate relatively to each other and extensive flexing and fatigue is obviated. Note that with both the journals 16 and pins 18 the resulting structure is formed by compression molding a double thickness of the parison material; the resultant shape, however, is not restricted to the parison shape or contour. In other words, the double thickness of material is used solely to provide a desired quantity of material, with that material being plastically deformed into the desired shape.

While it will be apparent that the preferred embodiments of the invention disclosed are well calculated to fulfill the objects above stated, it will be appreciated that the invention is susceptible to modification, variation and change without departing from the proper scope of fair meaning of the invention.

What is claimed is:

1. A plastic blow molded container blow molded from an extruded, hollow parison of thermoplastic material and including a lid and a base and being connected together for relative pivotal movement by a hinge structure, with each of the lid and base having side walls, said hinge structure comprising:

a pin structure molded integrally with one of the lid and base, and a journal structure molded integrally with the other of the lid and the base, said pin structure being rotatably supported by said journal structure, said pin structure comprising a generally solid pair of pin members each having a generally circular cross-section and being formed by the compression molding of the material generally from a double wall of the parison to form said circular cross-section, said pin members being axially aligned and extending axially outwardly from opposite first side walls, each of said first side walls having a first indented portion with the associated ones of said pins extending outwardly from said first indented portion whereby said one pin terminates proximately within the confines of said first indented portion, said journal structure comprising a pair of journal members defining a pair of coaxially aligned openings for receiving said pin members, each of said journal members depending from opposite second side walls, each of said second side walls having a second indented portion terminating in a generally non-indented strap portion and having a support portion located axially inwardly from said strap portion and from said second indented portion, said strap portion defining a first generally semicircular opening and said support portion defining a second generally semicircular opening axially offset from and facing in a direction towards said first generally semicircular opening whereby a pin opening is defined by each of said journal members, each said pin opening being in axial alignment with the other and being of a size to rotatably supportingly receive one of said pins, said journal members generally located within the confines of the periphery of said second side walls, said strap portion having a generally solid cross-section and being formed by compression molding of the material generally from a double wall of the parison to form said cross-section to have an axial width greater than that of a single thickness of the parison, said first indented portion being of a depth sufficient to receive the total width of the associated one of said journal members whereby each of said journal members and said pins are located within the periphery of said first and second side walls, said support portion being of a solid construction and being formed by compression molding of the material generally from a double wall of the parison, said strap portion being of a flexible construction whereby assembly onto an associated one of said pins is facilitated and each of said pins can be readily located in the associated one of said pin openings.

2. The container of claim 1 with the blow molded container being of a double wall construction and with said pin members each being of approximately 0.250 inch diameter.

3. The container of claim 1 with the blow molded container being of a double wall construction and with said strap portion having a width of approximately 0.120 inch.

4. The container of claim 1 with the blow molded container being of a double wall construction and with said strap portion having a width of approximately 0.120 inch and with said pin members each being of approximately 0.250 inch diameter.

5. A plastic blow molded container blow molded from an extruded, hollow parison of thermoplastic material and including a lid and a base and being connected together for relative pivotal movement by a hinge structure, with each of the lid and base having side walls, said hinge structure comprising:

a pin structure molded integrally with one of the lid and base, and a journal structure molded integrally with the other of the lid and the base, said pin structure being rotatably supported by said journal structure, said journal structure comprising a pair of journal members defining a pair of coaxially aligned openings for receiving said pin members, each of said journal members depending from opposite first side walls, each of said first side walls having an indented portion terminating in a generally non-indented strap portion and having a support portion located axially inwardly from said strap portion and from said indented portion, said strap portion defining a first generally semicircular opening and said support portion defining a second generally semicircular opening axially offset from and facing in a direction towards said first generally semicircular opening whereby a pin opening is defined by each of said journal members, each said pin opening being in axial alignment with the other and being of a size to rotatably supportingly receive a pin member.

6. The container of claim 5 with said strap portion having a generally solid cross-section and being formed by compression molding of the material generally from a double wall of the parison to form said cross-section to have an axial width greater than that of a single thickness of parison, said support portion being of a solid construction and being formed by compression molding of the material generally from a double wall of the parison, said strap portion being of a flexible construction whereby assembly onto a pin member is facilitated.

7. The container of claim 5 with said pin structure comprising a generally solid pair of pin members each having a generally circular cross-section and being formed by compression molding of the material generally from a double wall of the parison to form said circular cross-section, said pin members being aligned coaxially and extending axially outwardly from opposite second side walls, said strap portion having a generally solid cross-section and being formed by compression molding of the material generally from a double wall of the parison to form said cross-section to have an axial width greater than that of a single thickness of parison, said support portion being of a solid construction and being formed by compression molding of the material generally from a double wall of the parison, said strap portion being of a flexible construction whereby assembly onto an associated one of said pins is facilitated and each of said pins can be readily located in the associated one of said pin openings.

8. A plastic blow molded container blow molded from an extruded, hollow parison of thermoplastic material and including a lid and a base and being connected together for relative pivotal movement by a hinge structure, with each of the lid and base having side walls, said hinge structure comprising:

a pin structure molded integrally with one of the lid and base, and a journal structure molded integrally with the other of the lid and the base, said pin structure being rotatably supported by said journal structure, said pin structure comprising a generally solid pair of pin members each having a generally circular cross-section and being formed by compression molding of the material generally from a double wall of the parison to form said circular cross-section, said pin members being axially aligned and extending axially outwardly from opposite first side walls, each of said first side walls having a first indented portion with the associated ones of said pins extending outwardly from said first indented portion whereby said one pin terminates proximately within the confines of said first indented portion, said journal structure comprising a pair of journal members defining a pair of coaxially aligned openings *each of said journal members depending from opposite second side walls, each of said second side walls having a second indented portion terminating in a generally non-indented strap portion and having a support portion located axially inwardly from said*

*strap portion and from said second indented portion, said strap portion defining a first generally semicircular opening and said support portion defining a second generally semicircular opening axially offset from and facing in a direction to wards said first generally semicircular opening whereby a pin opening is defined by each of said journal members, each of said pin opening being in axial alignment with the other and being of a size to rotatably supportingly receive one of said pins,*

*said journal members generally located within the confines of the periphery of said second side walls* for receiving said pin members *said journal structure having sufficient flexibility to assist in assembling said pins into said aligned openings.*

[9. The container of claim 8 wherein said journal structure comprising a pair of journal members defining a pair of coaxially aligned openings for receiving said pin members, each of said journal members depending from opposite second side walls, each of said second side walls having a second indented portion terminating in a generally non-indented strap portion and having a support portion located axially inwardly from said strap portion and from said second indented portion, said strap portion defining a first generally semicircular opening and said support portion defining a second generally semicircular opening axially offset from and facing in a direction towards said first generally semicircular opening whereby a pin opening is defined by each of said journal members, each of said pin opening being in axial alignment with the other and being of a size to rotatably supportingly receive one of said pins, said journal members generally located within the confines of the periphery of said second side walls, said strap portion having a generally solid cross-section and being formed by compression molding of the material generally from a double wall of the parison to form said cross-section to have an axial width greater than that of a single thickness of the parison, said support portion being of a solid construction and being formed by compression molding of the material generally from a double wall of the parison, said strap portion being of a flexible construction whereby assembly onto an associated one of said pin is facilitated and each of said pins can be readily located in the associated one of said pin openings.]

* * * * *